US012120642B2

(12) United States Patent
Tang

(10) Patent No.: US 12,120,642 B2
(45) Date of Patent: *Oct. 15, 2024

(54) METHOD FOR DEMODULATING SHARED REFERENCE SIGNAL, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/455,954

(22) Filed: Nov. 22, 2021

(65) Prior Publication Data

US 2022/0086802 A1 Mar. 17, 2022

Related U.S. Application Data

(63) Continuation of application No. 16/466,866, filed as application No. PCT/CN2016/108707 on Dec. 6, 2016, now Pat. No. 11,218,994.

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0051* (2013.01); *H04L 5/10* (2013.01); *H04W 72/23* (2023.01)

(58) Field of Classification Search
CPC ... H04L 25/0202; H04L 5/0007; H04L 5/005; H04L 5/0051; H04L 5/0064;
(Continued)

(56) References Cited

U.S. PATENT DOCUMENTS

2011/0292825 A1 12/2011 Lee
2012/0106374 A1 5/2012 Gaal
(Continued)

FOREIGN PATENT DOCUMENTS

CN 102460999 A 5/2012
CN 102547872 A 7/2012
(Continued)

OTHER PUBLICATIONS

First Office Action of the Taiwanese application No. 106141456, dated Mar. 22, 2021.
(Continued)

*Primary Examiner* — Nizam U Ahmed

(57) ABSTRACT

Embodiments of the present application provide a method for demodulating a shared reference signal, a terminal device, and a network device. The method comprises: a terminal device receives first indication information sent by a network device, the first indication information being used for indicating resource information of a target resource group allocated for the terminal device; and the terminal device determines the length of the sequence of a shared reference signal according to the resource information of the target resource group, wherein the shared reference signal is a reference signal shared by multiple terminal devices, and the length of the sequence of the shared reference signal is used for demodulating the shared reference signal. Embodiments of the present application can implement channel estimation or channel measurement.

12 Claims, 8 Drawing Sheets

(51) Int. Cl.
   *H04L 5/10* (2006.01)
   *H04W 72/23* (2023.01)
(58) Field of Classification Search
   CPC ........ H04L 5/0094; H04L 5/10; H04W 28/20; H04W 72/02; H04W 72/042
   USPC .......................................................... 370/329
   See application file for complete search history.

(56) References Cited

U.S. PATENT DOCUMENTS

| | | | |
|---|---|---|---|
| 2012/0108254 A1 | 5/2012 | Kwon | |
| 2012/0113942 A1 | 5/2012 | Kim | |
| 2013/0242882 A1 | 9/2013 | Blankenship | |
| 2014/0247775 A1 | 9/2014 | Frenne | |
| 2014/0254539 A1 | 9/2014 | Nagata et al. | |
| 2014/0307757 A1 | 10/2014 | Seo et al. | |
| 2015/0078308 A1 | 3/2015 | Lee et al. | |
| 2015/0163008 A1 | 6/2015 | Kim et al. | |
| 2017/0331577 A1* | 11/2017 | Parkvall | H04W 8/18 |
| 2018/0076866 A1* | 3/2018 | Chen | H04L 27/261 |
| 2019/0173645 A1* | 6/2019 | Guo | H04L 5/0007 |
| 2019/0222405 A1* | 7/2019 | Wong | H04L 5/0053 |

FOREIGN PATENT DOCUMENTS

| | | |
|---|---|---|
| CN | 103095637 A | 5/2013 |
| CN | 103874207 A | 6/2014 |
| CN | 103944665 A | 7/2014 |
| CN | 103997722 A | 8/2014 |
| CN | 102547872 B | 12/2014 |
| CN | 104468019 A | 3/2015 |
| CN | 106059733 A | 10/2016 |
| EP | 2395677 A2 | 12/2011 |
| JP | 2010518677 A | 5/2010 |
| JP | 2019517202 A | 6/2019 |
| RU | 2530749 C2 | 10/2014 |
| WO | 2009084222 A1 | 7/2009 |
| WO | 2017193734 A1 | 11/2017 |

OTHER PUBLICATIONS

Second Office Action of the Canadian application No. 3046134, dated May 12, 2021.
First Office Action of the European application No. 16923416.8, dated Nov. 18, 2020.
Second Office Action of the Chinese application No. 201680091419.X, dated Sep. 29, 2020.
First Office Action of the Chilean application No. 201901549, dated Feb. 19, 2020.
Supplementary European Search Report in the European application No. 16923416.8, dated Mar. 10, 2020.
First Office Action of the Russian application No. 2019120850, dated Apr. 28, 2020.
"3rd Generation Partnership Project; Technical Specification Group Radio Access Network; Evolved Universal Terrestrial Radio Access (E-UTRA); Physical channels and modulation (Release 14)" 3GPP TS 36.211 V14.0.0 (Sep. 2016),http://www.3gpp.org.
Second Office Action of the European application No. 16923416.8, dated Mar. 4, 2021.
Decision of Refusal of the Chinese application No. 201680091419.X, dated Jan. 27, 2021.
First Office Action of the Japanese application No. 2019-530203, dated Jan. 5, 2021.
First Office Action of the Israeli application No. 267104, dated Dec. 23, 2020.
First Office Action of the Indian application No. 201917024792, dated Feb. 2, 2021.
Partial Supplementary European Search Report in the European application No. 16923416.8, dated Oct. 22, 2019.
Samsung, "DMRS Design Aspects for Nr", 3GPP TSG RAN WG1 Meeting #86bis R1-1609094, Lisbon, Portugal, Oct. 10-14, 2016.
Intel Corporation, "Discussion on DM-RS design for Nr", 3GPP TSG RAN WG1 Meeting #86bis R1-1609527, Lisbon, Portugal Oct. 10-14, 2016.
First Office Action of the Chinese application No. 201680091419.X, dated Jul. 1, 2020.
First Office Action of the Canadian application No. 3046134, dated Jul. 7, 2020.
Notice of Allowance of the Russian application No. 2019120850, dated Aug. 21, 2020.
First Office Action of the Brazilian application No. BR1120190114394, dated Sep. 15, 2020.
Notice of Allowance of the Japanese application No. 2021-076823, dated Oct. 14, 2022.
First Office Action of the U.S. Appl. No. 16/466,866, dated Jul. 22, 2020.
Final Office Action of the U.S. Appl. No. 16/466,866, dated Jan. 1, 2021.
Notice of Allowance of the U.S. Appl. No. 16/466,866, dated Sep. 2, 2021.
Corrected Notice of Allowance of the U.S. Appl. No. 16/466,866, dated Nov. 8, 2021.
First Office Action of the Chinese application No. 202010546900.1, dated May 30, 2022.
First Office Action of the Japanese application No. 2021-076823, dated May 27, 2022.
International Search Report in international application No. PCT/CN2016/108707, dated Aug. 3, 2017.
Written Opinion of the International Search Authority in international application No. PCT/CN2016/108707, dated Aug. 3, 2017.
First Office Action of the Malaysian application No. PI2019003219, dated May 11, 2023. 4 pages.
First Office Action of the Indonesian application No. P00201905607, dated Jul. 27, 2021.
First Office Action of the Australian application No. 2016431546, dated Sep. 9, 2021.
Hearing Notice of the Indian application No. 201917024792, issued on Feb. 13, 2024, 2 pages with English translation.
First Office Action of the Korean application No. 10-2019-7019010, issued on Jul. 11, 2024, 11 pages with English translation.

* cited by examiner

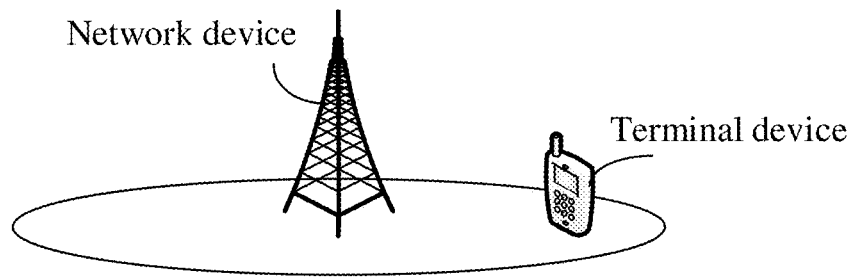

FIG. 1

A terminal device receives first indication information sent by a network device, here, the first indication information is to indicate resource information of a target resource group allocated for the terminal device ⸺210

The terminal device determines a length of a sequence of a shared reference signal according to the resource information of the target resource group, here, the shared reference signal is a reference signal shared by multiple terminal devices and the length of the sequence of the shared reference signal is used to demodulate the shared reference signal ⸺220

FIG. 2

METHOD FOR DEMODULATING SHARED REFERENCE SIGNAL, TERMINAL DEVICE, AND NETWORK DEVICE

CROSS REFERENCE TO RELATED APPLICATIONS

This application is a continuation of U.S. application Ser. No. 16/466,866 filed on Jun. 5, 2019, which is a national phase under 35 U.S.C. § 371 of PCT International Application No. PCT/CN2016/108707 filed on Dec. 6, 2016. The contents of these applications are hereby incorporated by reference in their entirety.

TECHNICAL FIELD

Embodiments of the disclosure relate to the field of communications, and more particularly, to a method for demodulating a shared reference signal, a terminal device and a network device.

BACKGROUND

In a Long Term Evolution (LTE) system, a terminal device may perform channel measurement or channel estimation according to a reference signal sent by a network device. A length of a sequence of the reference signal is an important parameter of the reference signal and the terminal device, if not knowing the length of the sequence of the reference signal, cannot demodulate the reference signal and namely cannot implement channel estimation or measurement. In the LTE system, the length of the sequence of the reference signal is usually twice a system bandwidth and the terminal device may acquire the system bandwidth through a system message and may further obtain the length of the sequence of the reference signal according to the system bandwidth.

In a future 5th-Generation (5G) system, a terminal device may not know a system bandwidth and thus cannot determine a length of a sequence of a shared reference signal according to a manner in LTE. Therefore, how to determine a length of a sequence of a shared reference signal in a future 5G system is a problem to be solved.

SUMMARY

The embodiments of the disclosure provide a method for demodulating a shared reference signal, a terminal device and a network device, so as to demodulate the shared reference signal.

In a first aspect, there is provided a method for demodulating a shared reference signal, which may include the following operations.

A terminal device receives first indication information sent by a network device, here, the first indication information is to indicate resource information of a target resource group allocated for the terminal device; and the terminal device determines a length of a sequence of the shared reference signal according to the resource information of the target resource group, here, the shared reference signal being a reference signal shared by multiple terminal devices and the length of the sequence of the shared reference signal is used to demodulate the shared reference signal.

Therefore, in the embodiments of the disclosure, the terminal device may determine the length of the sequence of the shared reference signal according to the resource information, sent by the network device, of the target resource group and further demodulate the shared reference signal to finally implement channel estimation or channel measurement.

In combination with the first aspect, in some implementation modes of the first aspect, the first indication information may be used to indicate a resource in the target resource group or a resource size of a resource in the target resource group, and the operation that the terminal device determines the length of the sequence of the shared reference signal according to the resource information of the target resource group may include that: the terminal device determines the length of the sequence of the shared reference signal according to a resource size, which is determined according to the resource in the target resource group, of the resource in the target resource group or according to the resource size, which is indicated by the first indication information, of the resource in the target resource group.

In combination with the first aspect, in some implementation modes of the first aspect, the operation that the terminal device determines the length of the sequence of the shared reference signal according to the resource size, which is determined according to the resource in the target resource group, of the resource in the target resource group or according to the resource size, which is indicated by the first indication information, of the resource in the target resource group may include that: the terminal device determines the length of the sequence of the shared reference signal according to the resource size, which is determined according to the resource in the target resource group, of the resource in the target resource group and first preset relationships between resource sizes and lengths of sequences of reference signals, or the terminal device determines the length of the sequence of the shared reference signal according to the resource size, which is indicated by the first indication information, of the resource in the target resource group and first preset relationships between resource sizes and lengths of sequences of reference signals.

In combination with the first aspect, in some implementation modes of the first aspect, the first indication information may be used to indicate a resource in a target resource section where the target resource group is located or a resource size of a resource in a target resource section where the target resource group is located, and the operation that the terminal device determines the length of the sequence of the shared reference signal according to the resource information of the target resource group may include that: the terminal device determines the length of the sequence of the shared reference signal according to a resource size, which is determined according to the resource in the target resource section, of the resource in the target resource section or according to the resource size, which is indicated by the first indication information, of the resource in the target resource section.

In combination with the first aspect, in some implementation modes of the first aspect, the operation that the terminal device determines the length of the sequence of the shared reference signal according to the resource size, which is determined according to the resource in the target resource section, of the resource in the target resource section or according to the resource size, which is indicated by the first indication information, of the resource in the target resource section may include that: the terminal device determines the length of the sequence of the shared reference signal according to the resource size, which is determined according to the resource in the target resource section, of the resource in the target resource section and second preset relationships between resource sizes and lengths of sequences of reference signals, or the terminal device determines the length of the sequence of the shared reference signal according to the resource size, which is indicated by the first indication information, of the resource in the target resource section and second preset relationships between resource sizes and lengths of sequences of reference signals.

In combination with the first aspect, in some implementation modes of the first aspect, the first indication information may be used to indicate a Physical Resource Block (PRB) in the target resource group or a total number of PRBs in the target resource group.

In combination with the first aspect, in some implementation modes of the first aspect, the first indication information may be used to indicate a PRB in the target resource section or a total number of PRBs in the target resource section.

In combination with the first aspect, in some implementation modes of the first aspect, each first preset relationship may represent that the length of the sequence of the reference signal is N times the resource size, here, N is an integer greater than or equal to 1.

In combination with the first aspect, in some implementation modes of the first aspect, N may be an integral multiple of a first numerical value, here, the first numerical value is a numerical value which is predetermined by the terminal device and the network device.

In combination with the first aspect, in some implementation modes of the first aspect, each second preset relationship may represent that the length of the sequence of the reference signal is M times the resource size, here, M is an integer greater than or equal to 1.

In combination with the first aspect, in some implementation modes of the first aspect, M may be an integral multiple of a second numerical value, here, the second numerical value is a numerical value which is predetermined by the terminal device and the network device.

In combination with the first aspect, in some implementation modes of the first aspect, the method may further include that: before the operation that the terminal device receives the first indication information sent by the network device, the terminal device receives second indication information sent by the network device, here, the second indication information is to indicate an initial operation bandwidth allocated for the terminal device and the initial operation bandwidth is less than a system bandwidth; and the terminal device determines the length of the sequence of the shared reference signal according to the initial operation bandwidth and third preset relationships between operation bandwidths and lengths of sequences of reference signals.

Each third preset relationship may be configured to represent that the length of the sequence of the reference signal is L times the resource size, here, L is an integer greater than or equal to 1. Furthermore, L may be a multiple of a third numerical value which is predetermined by the terminal device and the network device.

In a second aspect, there is provided a method for demodulating a shared reference signal, which may include the following operations.

A terminal device receives first indication information sent by a network device; and the terminal device determines a target sequence corresponding to the terminal device from a sequence of the shared reference signal according to the first indication information, here, the shared reference signal is a reference signal shared by multiple terminal devices and the target sequence is used to demodulate a target reference signal corresponding to the terminal device from the shared reference signal.

In the embodiments of the disclosure, the terminal device may determine the target sequence corresponding to the terminal device from the sequence of the shared reference signal through notification information of the network device and may demodulate the target reference signal corresponding to the target sequence to implement channel estimation or measurement.

In combination with the second aspect, in some implementation modes of the second aspect, the first indication information may be used to indicate position information of the target sequence, and the operation that the terminal device determines the target sequence corresponding to the terminal device from the sequence of the shared reference signal according to the first indication information may include that: the terminal device determines the target sequence from the sequence of the shared reference signal according to the position information of the target sequence and a length of the target sequence.

In combination with the second aspect, in some implementation modes of the second aspect, the first indication information may be used to indicate a starting position of the target sequence in the sequence of the shared reference signal.

In combination with the second aspect, in some implementation modes of the second aspect, the first indication information may be used to indicate resource information of a target resource group, and the operation that the terminal device determines the target sequence corresponding to the terminal device from the sequence of the shared reference signal according to the first indication information may include that: the terminal device determines a position of the target sequence in the sequence of the shared reference signal according to the resource information of the target resource group; and the terminal device determines the target sequence from the sequence of the shared reference signal according to the position of the target sequence in the sequence of the shared reference signal and a length of the target sequence.

In combination with the second aspect, in some implementation modes of the second aspect, the first indication information may be used to indicate a position of a resource in the target resource group in a system resource.

The system resource may refer to all time-frequency resources in a cell where the terminal device is located.

In a third aspect, there is provided a method for demodulating a shared reference signal, which may include the following operations.

A network device determines first indication information, here, the first indication information is to indicate resource information of a target resource group allocated for a terminal device; and the network device sends the first indication information to the terminal device such that the terminal device determines the resource information of the target resource group according to the first indication information and determines a length of a sequence of the shared reference signal according to the resource information of the target resource group, here, the shared reference signal is a reference signal shared by multiple terminal devices and the length of the sequence of the shared reference signal is used to demodulate the shared reference signal.

In combination with the third aspect, in some implementation modes of the third aspect, the first indication information may be used to indicate a resource in the target resource group or a resource size of a resource in the target resource group.

In combination with the third aspect, in some implementation modes of the third aspect, the first indication information may be used to indicate a resource in a target resource section where the target resource group is located or a resource size of a resource in a target resource section where the target resource group is located.

In combination with the third aspect, in some implementation modes of the third aspect, the first indication information may be used to indicate a PRB in the target resource group or a total number of PRBs in the target resource group.

In combination with the third aspect, in some implementation modes of the third aspect, the first indication information may be used to indicate a PRB in the target resource section or a total number of PRBs in the target resource section.

In combination with the third aspect, in some implementation modes of the third aspect, the method may further include that: before the operation that the network device sends the first indication information to the terminal device, the network device sends second indication information to the terminal device, here, the second indication information is to indicate an initial operation bandwidth allocated for the terminal device such that the terminal device determines the length of the sequence of the shared reference signal according to the initial operation bandwidth and second preset relationships between operation bandwidths and lengths of sequences of reference signals, here, the initial operation bandwidth is less than a system bandwidth.

In a fourth aspect, there is provided a method for demodulating a shared reference signal, which may include the following operations.

A network device determines first indication information; and the network device sends the first indication information to a terminal device such that the terminal device determines a target sequence corresponding to the terminal device from a sequence of the shared reference signal according to the first indication information, here, the shared reference signal is a reference signal shared by multiple terminal devices and the target sequence is used to demodulate a target reference signal corresponding to the terminal device from the shared reference signal.

In combination with the fourth aspect, in some implementation modes of the fourth aspect, the first indication information may be used to indicate position information of the target sequence.

In combination with the fourth aspect, in some implementation modes of the fourth aspect, the first indication information may be used to indicate a starting position of the target sequence in the sequence of the shared reference signal.

In combination with the fourth aspect, in some implementation modes of the fourth aspect, the first indication information may be used to indicate resource information of a target resource group.

In combination with the fourth aspect, in some implementation modes of the fourth aspect, the first indication information may be used to indicate a position of a resource in the target resource group in a system resource.

In a fifth aspect, there is provided a terminal device, which includes modules configured to execute the method in the first aspect or each implementation mode thereof.

In a sixth aspect, there is provided a terminal device, which includes modules configured to execute the method in the second aspect or each implementation mode thereof.

In a seventh aspect, there is provided a network device, which includes modules configured to execute the method in the third aspect or each implementation mode thereof.

In an eighth aspect, there is provided a network device, which includes modules configured to execute the method in the fourth aspect or each implementation mode thereof.

In a ninth aspect, there is provided a terminal device, which includes a transceiver and a processor. The transceiver and the processor may be configured to execute the method in the first aspect or each implementation mode thereof.

In a tenth aspect, there is provided a terminal device, which includes a transceiver and a processor. The transceiver and the processor may be configured to execute the method in the second aspect or each implementation mode thereof.

In an eleventh aspect, there is provided a network device, which includes a processor and a transceiver. The processor and the transceiver may be configured to execute the method in the third aspect or each implementation mode thereof.

In a twelfth aspect, there is provided a network device, which includes a processor and a transceiver. The processor and the transceiver may be configured to execute the method in the fourth aspect or each implementation mode thereof.

In a thirteenth aspect, there is provided a computer-readable medium, which stores a program code configured to be executed by a terminal device. The program code includes an instruction configured to execute the method in the first aspect and each implementation mode thereof.

In a fourteenth aspect, there is provided a computer-readable medium, which stores a program code configured to be executed by a terminal device. The program code includes an instruction configured to execute the method in the second aspect and each implementation mode thereof.

In a fifteenth aspect, there is provided a computer-readable medium, which stores a program code configured to be executed by a network device. The program code includes an instruction configured to execute the method in the third aspect and each implementation mode thereof.

In a sixteenth aspect, there is provided a computer-readable medium, which stores a program code configured to be executed by a network device. The program code includes an instruction configured to execute the method in the fourth aspect and each implementation mode thereof.

In a seventeenth aspect, there is provided a system chip, which includes an input interface, an output interface, a processor and a memory. The processor is configured to execute a code in the memory. When the code is executed, the processor may implement the method in the first aspect and each implementation mode.

In an eighteenth aspect, there is provided a system chip, which includes an input interface, an output interface, a processor and a memory. The processor is configured to execute a code in the memory. When the code is executed, the processor may implement the method in the second aspect and each implementation mode.

In a nineteenth aspect, there is provided a system chip, which includes an input interface, an output interface, a processor and a memory. The processor is configured to execute a code in the memory. When the code is executed, the processor may implement the method in the third aspect and each implementation mode.

In a twentieth aspect, there is provided a system chip, which includes an input interface, an output interface, a processor and a memory. The processor is configured to execute a code in the memory. When the code is executed, the processor may implement the method in the fourth aspect and each implementation mode.

BRIEF DESCRIPTION OF DRAWINGS

FIG. 1 is a schematic diagram of a possible application scenario according to an embodiment of the disclosure.

FIG. 2 is a schematic flowchart of a method for demodulating a shared reference signal according to an embodiment of the disclosure.

DETAILED DESCRIPTION

Figure 3:
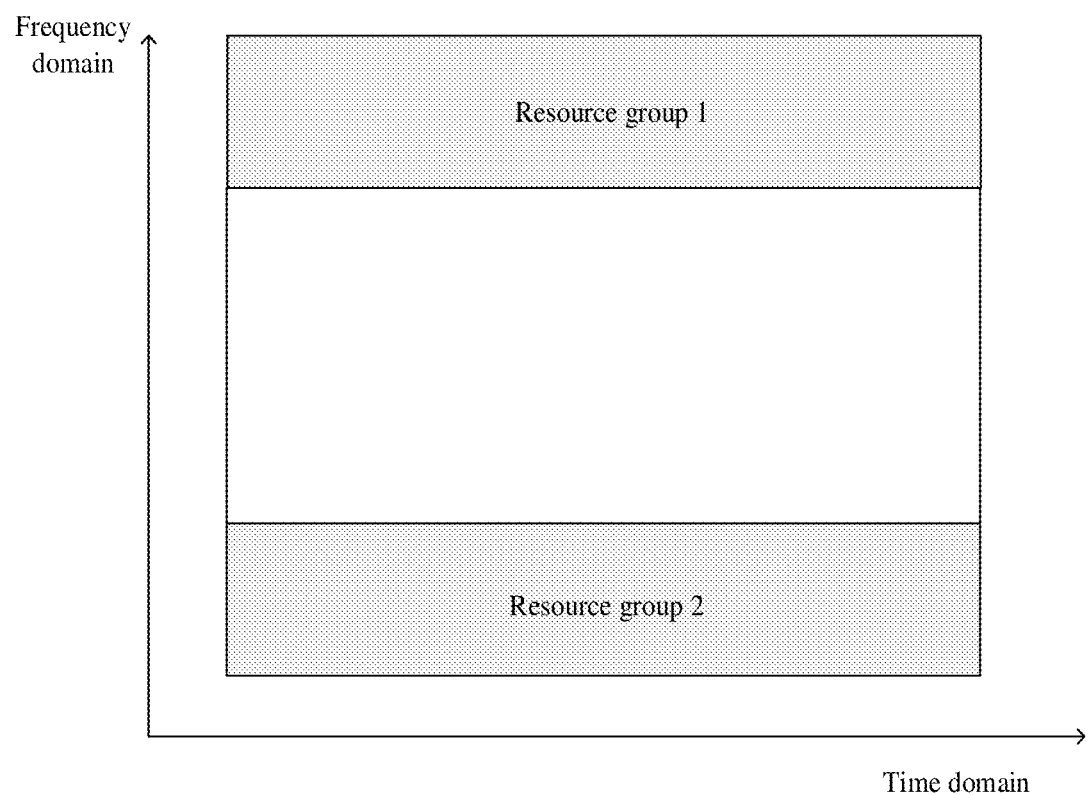
FIG. 3 is a schematic diagram of a target resource group according to an embodiment of the disclosure.

The technical solutions in the embodiments of the disclosure will be clearly and completely described below in combination with the drawings in the embodiments of the disclosure.

It is to be understood that a method for scheduling terminal device in the embodiments of the disclosure may be applied to various communication systems, for example, a present communication system like a Global System of Mobile Communication (GSM), a Code Division Multiple Access (CDMA) system, a Wideband Code Division Multiple Access (WCDMA) system, a General Packet Radio Service (GPRS), an LTE system and a Universal Mobile Telecommunication System (UMTS), and may particularly be applied to a future 5th-Generation (5G) system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communications. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems that adopt the nonorthogonal multiple access technologies.

For better understanding a method for demodulating a shared reference signal, terminal device and network device of the embodiments of the disclosure, a possible application scenario of the embodiments of the disclosure will be simply introduced below in combination with FIG. 1.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network device in a future 5G network, a network device in a future evolved Public Land Mobile Network (PLMN) or the like.

The wireless communication system 100 further includes at least one terminal device 120 located within the coverage of the network device 110. The terminal devices 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the 5G system or network may also be called a New Radio (NR) system or network.

It is to be understood that FIG. 1 only exemplarily illustrates a network device and two terminal devices. Optionally, the wireless communication system 100 may include multiple network devices and there are another number of terminal devices in coverage of each network device. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a schematic flowchart of a method for demodulating a shared reference signal according to an embodiment of the disclosure. The method 200 illustrated in FIG. 2 includes the following operations.

In 210, a terminal device receives first indication information sent by a network device, here, the first indication information is to indicate resource information of a target resource group allocated for the terminal device.

The first indication information may be carried in a system message, a broadcast message or a Radio Resource Control (RRC) message.

Optionally, a bandwidth occupied by the target resource group is less than a system bandwidth and, moreover, the target resource group may be a resource group and may also be multiple resource groups. As illustrated in FIG. 3, the target resource group may include a resource group 1 only and may also include both of the resource group 1 and a resource group 2. When the target resource group includes the resource group 1 only, all of terminal devices in the resource group 1 may perform channel estimation or channel measurement by use of a shared reference signal corresponding to the target resource group. When the target resource group includes the resource group 1 and the resource group 2, all of terminal devices in the resource group 1 and the resource group 2 may perform channel estimation or channel measurement by use of shared reference signals corresponding to the target resource group.

In addition, the resource group may consist of one or more resource blocks and the resource blocks may be Physical Resource Blocks (PRBs).

In 220, the terminal device determines a length of a sequence of the shared reference signal according to the resource information of the target resource group, here, the shared reference signal is a reference signal shared by multiple terminal devices and the length of the sequence of the shared reference signal is used to demodulate the shared reference signal.

It is to be understood that the terminal device, before performing channel estimation or channel measurement, is required to determine the length of the sequence of the shared reference signal at first and then demodulates the shared reference signal according to the length of the sequence of the shared reference signal to further implement channel measurement or estimation.

In the embodiment of the disclosure, the terminal device may determine the length of the sequence of the shared reference signal according to the resource information, sent by the network device, of the target resource group and further demodulate the shared reference signal to finally implement channel estimation or channel measurement.

It is to be understood that multiple terminal devices may share the shared reference signal and perform channel estimation or channel measurement by use of the shared reference signal. Herein, the multiple terminal devices may be terminal devices located in the same cell and may also be terminal devices located under the same beam or terminal devices located in the same group.

Alternatively, the length of the sequence of the shared reference signal may also be predetermined by the terminal device and the network device (for example, it may be predetermined in a communication protocol). Then, the terminal device is not required to determine the length of the sequence of the shared reference signal according to the first indication information sent by the network device but may directly determine the length of the sequence of the shared reference signal according to a predetermination.

Optionally, the first indication information may be used to indicate a resource in the target resource group or a resource size of a resource in the target resource group. Then, the operation that the terminal device determines the length of the sequence of the shared reference signal according to the resource information of the target resource group includes that: the terminal device determines the length of the sequence of the shared reference signal according to: a resource size, which is determined according to the resource in the target resource group, of the resource in the target resource group; or the resource size, which is indicated by the first indication information, of the resource in the target resource group.

That is, if the first indication information directly indicates the resource size of the resource in the target resource group, the terminal device may directly determine the length of the sequence of the shared reference signal according to the resource size of the resource in the target resource group. When the first indication information indicates the resource in the target resource group (for example, the first indication information may indicate an index of the resource in the target resource group), the terminal device may determine the resource size of the resource in the target resource group according to the resource in the target resource group at first and then determine the length of the sequence of the shared reference signal according to the resource size of the resource in the target resource group.

Furthermore, the operation that the terminal device determines the length of the sequence of the shared reference signal according to the resource size, which is determined according to the resource in the target resource group, of the resource in the target resource group or the resource size, which is indicated by the first indication information, of the resource in the target resource group may include that: the terminal device determines the length of the sequence of the shared reference signal according to: the resource size, which is determined according to the resource in the target resource group, of the resource in the target resource group; and first preset relationships between resource sizes and lengths of sequences of reference signals, or the terminal device determines the length of the sequence of the shared reference signal according to: the resource size, which is indicated by the first indication information, of the resource in the target resource group; and first preset relationships between resource sizes and lengths of sequences of reference signals.

The resource size may be represented with the number of PRBs or represented with the number of other resource blocks. There are no limits made thereto in the embodiment of the disclosure.

Optionally, the first indication information may be used to indicate a PRB in the target resource group or the number of PRBs in the target resource group.

Specifically, for example, the first indication information may directly indicate that the target resource group includes three PRBs. In addition, the first indication information may also indicate that the target resource group includes PRBs numbered to be 1, 3 and 5, and then the terminal device may determine that the target resource group includes three PRBs according to the PRBs numbered to be 1, 3 and 5 in the target resource group.

Optionally, each first preset relationship may represent that the length of the sequence of the reference signal is N times the resource size of the resource in the target resource group, here, N is an integer greater than or equal to 1. For example, when the resource size of the resource in the target resource group is three PRBs, the length of the sequence of the shared reference signal may be nine PRBs (in such case, N is 3).

Furthermore, a value of N may be an integral multiple of a first numerical value, here, the first numerical value is a numerical value which is predetermined by the terminal device and the network device or a numerical value predetermined in the communication protocol. That is, although a value range of N is very large, in consideration of some special requirements in a communication process, the value of N is required to be an integral multiple of a certain numerical value. For example, N may be a multiple of a numerical value such as 4 or 8.

Optionally, the first indication information may further be used to indicate a resource in a target resource section where the target resource group is located or a resource size of a resource in a target resource section where the target resource group is located. In such case, the operation that the terminal device determines the length of the sequence of the shared reference signal according to resource information of the target resource group includes that: the terminal device determines the length of the sequence of the shared reference signal according to: a resource size, which is determined according to the resource in the target resource section, of the resource in the target resource section; or the resource size, which is indicated by the first indication information, of the resource in the target resource section.

It is to be understood that the target resource section may be a continuous resource section between a PRB with a maximum number and PRB with a minimum number in the target resource group and the target resource section includes the PRB with the maximum number and the PRB with the minimum number. For example, the target resource group includes three PRBs numbered to be 1, 3 and 5 respectively, and the target resource section includes five PRBs numbered to be 1-5, the PRBs numbered to be 2 and 4 are PRBs belonging to another resource group outside the target resource group.

For example, as illustrated in FIG. 2, there is made such a hypothesis that the target resource group includes the resource group 1 and the resource group 2, the resource group 2 includes PRBs numbered to be 1-3, the resource group 1 includes PRBs numbered to be 8-10 and PRBs numbered to be 4-7 are further included between the resource group 1 and the resource group 2. In such case, the target resource section includes the ten PRBs numbered to be 1-10 and the target resource group only includes the six PRBs numbered to be 1-3 and numbered to be 8-10.

Specifically, if the first indication information directly indicates the resource size of the resource in the target resource section, the terminal device may directly determine the length of the sequence of the shared reference signal according to the resource size of the resource in the target resource section. When the first indication information indicates the resource in the target resource section (for example, it may indicate an index of the resource in the target resource section), the terminal device may determine the resource size of the resource in the target resource section according to the resource in the target resource section at first and then determine the length of the sequence of the shared reference signal according to the resource size of the resource in the target resource section.

Furthermore, the operation that the terminal device determines the length of the sequence of the shared reference signal according to the resource size, which is determined according to the resource in the target resource section, of the resource in the target resource section, or the resource size, which is indicated by the first indication information, of the resource in the target resource section may include that: the terminal device determines the length of the sequence of the shared reference signal according to: the resource size, which is determined according to the resource in the target resource section, of the resource in the target resource section; and second preset relationships between resource sizes and lengths of sequences of reference signals, or the terminal device determines the length of the sequence of the shared reference signal according to: the resource size, which is indicated by the first indication information, of the resource in the target resource section; and second preset relationships between resource sizes and lengths of sequences of reference signals.

Optionally, the first indication information may be used to indicate a PRB in the target resource section or the number of PRBs in the target resource section.

In general, the number of the PRBs in the target resource section is required to be greater than the number of the PRBs in the target resource group. Then, the length, which is determined by the terminal device according to the resource size of the resource in the target resource section, of the sequence of the shared reference signal may be greater than the length, which is determined according to the resource size of the resource in the target resource group, of the sequence of the shared reference signal, so that the terminal device may implement channel estimation or channel measurement according to the shared reference signal.

The second preset relationships may be similar to the first preset relationships and each second preset relationship may represent that the length of the sequence of the shared reference signal is M times the resource size of the resource in the target resource section, here, M is an integer greater than or equal to 1. For example, when the resource size of the resource in the target resource section is three PRBs, the length of the sequence of the shared reference signal may be 12 PRBs (in such case, M is 4).

Furthermore, a value of M may be an integral multiple of a second numerical value, here, the second numerical value is a numerical value which is predetermined by the terminal device and the network device or a numerical value predetermined in the communication protocol. That is, although a value range of M is very large, in consideration of some special requirements in the communication process, the value of M is required to be an integral multiple of a certain numerical value. For example, M may be a multiple of a numerical value such as 3 or 9.

It is to be understood that in the embodiment of the disclosure, the values of N and M are not limited and relationships with the first numerical value and the second numerical value are also not limited.

Optionally, as an embodiment, the method illustrated in FIG. 2 further includes that: before the operation that the terminal device receives the first indication information sent by the network device, the terminal device receives second indication information sent by the network device, here, the second indication information is to indicate an initial operation bandwidth allocated for the terminal device and the initial operation bandwidth is less than a system bandwidth; and the terminal device determines the length of the sequence of the shared reference signal according to the initial operation bandwidth and third preset relationships between operation bandwidths and lengths of sequences of reference signals.

When the terminal device initially accesses a network, the network device may have yet not allocate any resource group for the terminal device. In such case, the network device allocates the initial operation bandwidth for the terminal device from the system bandwidth. For enabling the terminal device to implement channel estimation or channel measurement when initially accessing the network, the network device may notify the terminal device of the initial operation bandwidth for the terminal device through indication information such that the terminal device determines the length of the sequence of the shared reference signal according to the initial operation bandwidth and correspondences between operation bandwidths and lengths of sequences of shared reference signals and further implement channel estimation or channel measurement when initially accessing the network.

It is to be understood that in the embodiment of the disclosure, the operation that the terminal device receives the second indication information sent by the network device and the operation that the terminal device receives the first indication information sent by the network device may be mutually independent. That is, the terminal device may finally determine the length of the sequence of the shared reference signal independently according to the resource information obtained through the first indication information. Or the terminal device may also finally determine the length of the sequence of the shared reference signal independently according to the initial operation bandwidth determined through the second indication information. Or the terminal device may also determine, when initially accessing a system, the length of the sequence of the shared reference signal according to the initial operation bandwidth determined through the second indication information and then may re-determine the length of the sequence of the shared reference signal according to the resource information obtained through the received first indication information.

Optionally, the third preset relationships may be similar to the first preset relationships or the second preset relationships. That is, each third preset relationship may represent that the length of the sequence of the reference signal is a multiple of the initial operation bandwidth and the multiple may be an integer greater than 1 and, furthermore, may also be a multiple of a special numerical value (for example, 4 or 8) which are predetermined by the network device and the terminal device.

It is to be understood that the second indication information may also be carried in the system message, the broadcast message or the RRC message.

Figure 4:
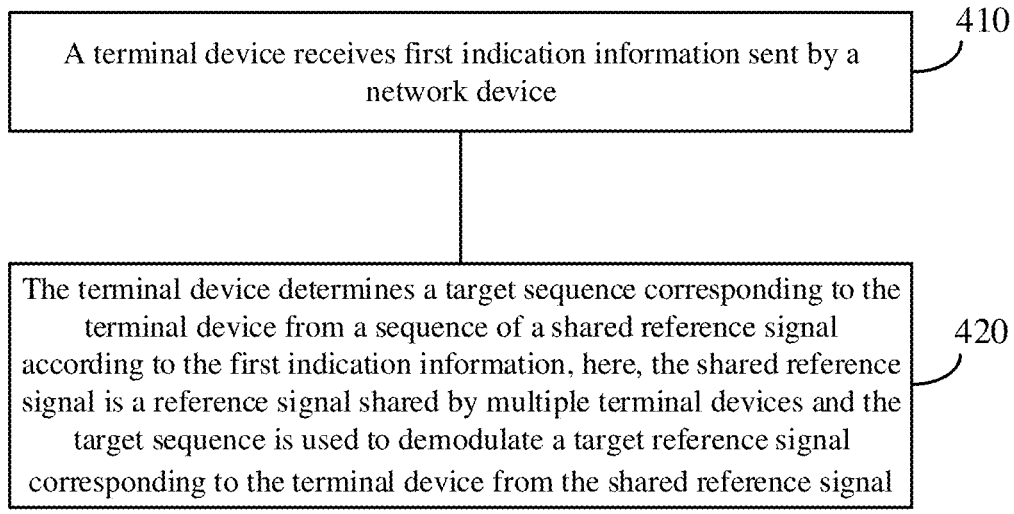
FIG. 4 is a schematic flowchart of a method for demodulating a shared reference signal according to an embodiment of the disclosure.

FIG. 4 is a schematic flowchart of a method for demodulating a shared reference signal according to an embodiment of the disclosure. The method 400 illustrated in FIG. 4 includes the following operations.

In 410, a terminal device receives first indication information sent by a network device.

Herein, the first indication information may be carried in a system message, a broadcast message or an RRC message.

In 420, the terminal device determines a target sequence corresponding to the terminal device from a sequence of the shared reference signal according to the first indication information, here, the shared reference signal is a reference signal shared by multiple terminal devices and the target sequence is used to demodulate a target reference signal corresponding to the terminal device from the shared reference signal.

In the embodiments of the disclosure, the terminal device may determine the target sequence corresponding to the terminal device from the sequence of the shared reference signal through notification information of the network device and may demodulate the target reference signal corresponding to the target sequence to implement channel estimation or measurement.

The length of the sequence of the shared reference signal may be determined according to a system bandwidth. That is, all terminal devices interacting with the network device may implement channel estimation or measurement according to the shared reference signal. However, if the sequence of the shared reference signal is too long, the terminal device may demodulate a segment of the sequence of the shared reference signal to implement channel measurement or estimation, so that complexity in channel estimation or measurement implemented by the terminal device according to the shared reference signal may be simplified.

Optionally, the first indication information may be used to indicate position information of the target sequence. In such case, the operation that the terminal device determines the target sequence corresponding to the terminal device from the sequence of the shared reference signal according to the first indication information may include that: the terminal device determines the target sequence from the sequence of the shared reference signal according to the position information of the target sequence and a length of the target sequence.

Furthermore, the first indication information may be used to indicate a starting position of the target sequence in the sequence of the shared reference signal. Then, the terminal device may determine the starting position of the target sequence in the sequence of the shared reference signal according to the first indication information and then may determine the target sequence from the sequence of the shared reference signal according to the length of the target sequence.

The first indication information directly indicates the position information of the target sequence, and may also indirectly indicate the position of the target sequence by indicating resource information of the terminal device.

Optionally, the first indication information may be used to indicate resource information of a target resource group. In such case, the operation that the terminal device determines the target sequence corresponding to the terminal device from the sequence of the shared reference signal according to the first indication information may include that: the terminal device determines a position of the target sequence in the sequence of the shared reference signal according to the resource information of the target resource group; and the terminal device determines the target sequence from the sequence of the shared reference signal according to the position of the target sequence in the sequence of the shared reference signal and a length of the target sequence.

Optionally, the first indication information may also indicate a position of a resource in the target resource group in a system resource. Specifically, the position of the resource in the target resource group in the system resource may be a starting position, an ending position or other position information. Herein, the system resource may refer to all time-frequency resources in a cell where the terminal device is located.

It is to be understood that the position of the resource in the target resource group is associated with the position of the target sequence to a certain extent and the terminal device, after obtaining the position of the resource in the target resource group, may determine the position of the target sequence according to correspondences between positions of resources in target resource groups and target sequences.

That is, the network device may directly indicate the starting position of the target sequence in the sequence of the shared reference signal through the indication information and may also indirectly or implicitly indicate the starting position of the target sequence in the sequence of the shared reference signal through the indication information.

It is to be understood that in the method illustrated in FIG. 2, the terminal device determines the length of the sequence of the shared reference signal according to the resource information of the allocated resource group and then demodulates the shared reference signal according to the length of the sequence of the shared reference signal. In the method illustrated in FIG. 4, the terminal device is not required to determine the length of the sequence of the shared reference signal but directly determines the position of the target sequence corresponding to the terminal device in the sequence of the shared reference signal and then may demodulate the shared reference signal according to the target sequence.

The methods for demodulating the shared reference signal in the embodiments of the disclosure are introduced above in combination with FIG. 2-4 from the angle of the terminal device in detail and the methods for demodulating the shared reference signal in the embodiments of the disclosure will be described below in combination with FIG. 5 and FIG. 6 from the angle of the network device.

It is to be understood that the methods for demodulating the shared reference signal, which are described from the angle of the network device, in the embodiments of the disclosure correspond to the methods for demodulating the shared reference signal, which are described from the angle of the terminal device, in the embodiments of the disclosure. For simplicity, repeated descriptions are properly omitted.

Figure 5:
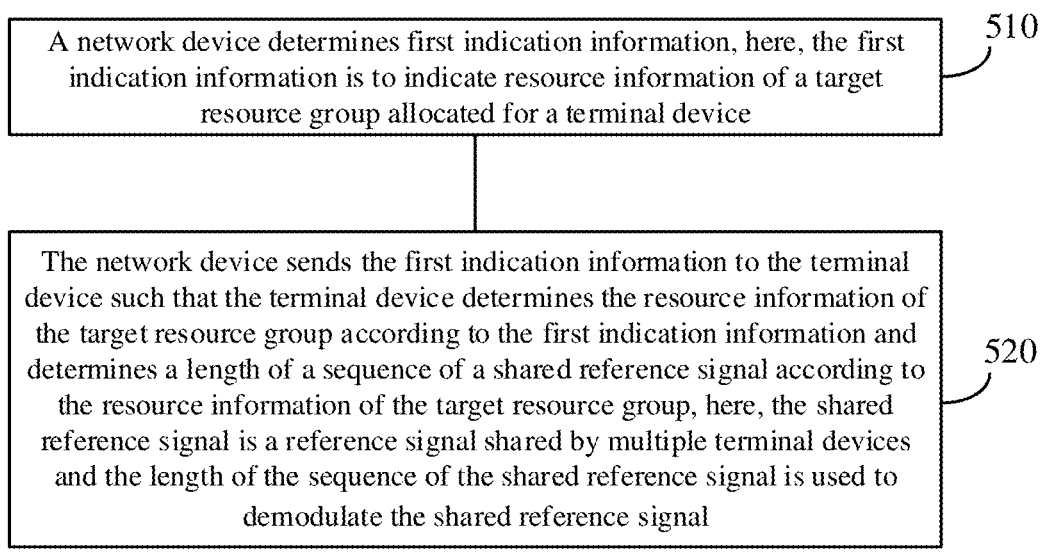
FIG. 5 is a schematic flowchart of a method for demodulating a shared reference signal according to an embodiment of the disclosure.

FIG. 5 is a schematic flowchart of a method for demodulating a shared reference signal according to an embodiment of the disclosure. The method 500 illustrated in FIG. 5 includes the following operations.

In 510, a network device determines first indication information, here, the first indication information is to indicate resource information of a target resource group allocated for a terminal device.

In 520, the network device sends the first indication information to the terminal device such that the terminal device determines the resource information of the target resource group according to the first indication information and determines a length of a sequence of the shared reference signal according to the resource information of the target resource group, here, the shared reference signal is a reference signal shared by multiple terminal devices and the length of the sequence of the shared reference signal is used to demodulate the shared reference signal.

In the embodiment of the disclosure, the network device may notify the resource information of the target resource group for the terminal device through the indication information such that the terminal device determines the length of the sequence of the shared reference signal according to the resource information of the target resource group and further demodulates the shared reference signal to finally implement channel estimation or channel measurement.

Optionally, as an embodiment, the first indication information is to indicate a resource in the target resource group or a resource size of a resource in the target resource group.

Optionally, as an embodiment, the first indication information is to indicate a resource in a target resource section where the target resource group is located or a resource size of a resource in a target resource section where the target resource group is located.

Optionally, as an embodiment, the first indication information is to indicate a PRB in the target resource group or the number of PRBs in the target resource group.

Optionally, as an embodiment, the first indication information is to indicate a PRB in the target resource section or the number of PRBs in the target resource section.

Optionally, as an embodiment, the method further includes that: before the operation that the network device sends the first indication information to the terminal device, the network device sends second indication information to the terminal device, here, the second indication information is to indicate an initial operation bandwidth allocated for the terminal device such that the terminal device determines the length of the sequence of the shared reference signal according to the initial operation bandwidth and second preset relationships between operation bandwidths and lengths of sequences of reference signals, here, the initial operation bandwidth is less than a system bandwidth.

Figure 6:
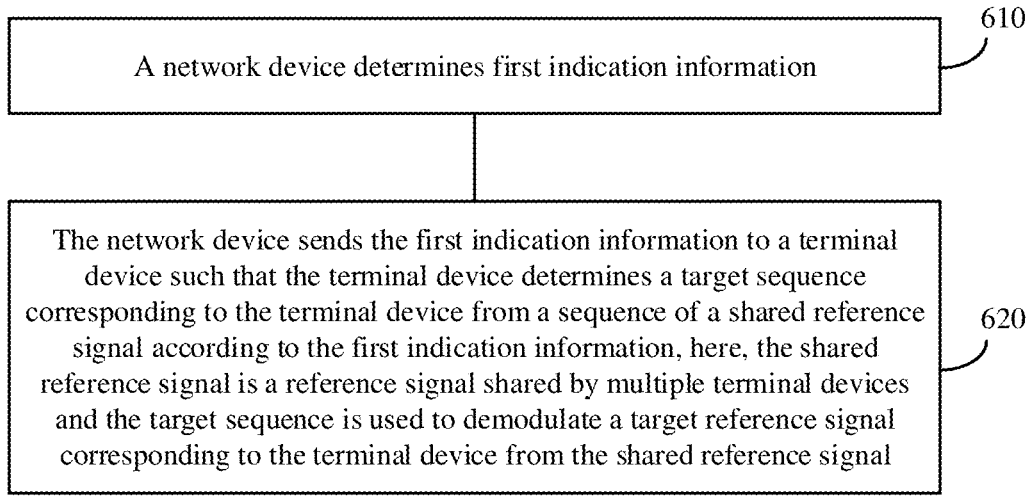
FIG. 6 is a schematic flowchart of a method for demodulating a shared reference signal according to an embodiment of the disclosure.

FIG. 6 is a schematic flowchart of a method for demodulating a shared reference signal according to an embodiment of the disclosure. The method 600 illustrated in FIG. 6 includes the following operations.

In 610, a network device determines first indication information.

In 620, the network device sends the first indication information to a terminal device such that the terminal device determines a target sequence corresponding to the terminal device from a sequence of the shared reference signal according to the first indication information, here, the shared reference signal is a reference signal shared by multiple terminal devices and the target sequence is used to demodulate a target reference signal corresponding to the terminal device from the shared reference signal.

In the embodiment of the disclosure, the network device may indicate the target sequence corresponding to the terminal device through the indication information such that the terminal device determines the target sequence and demodulates the target reference signal corresponding to the target sequence to implement channel estimation or measurement.

Optionally, as an embodiment, the first indication information is to indicate position information of the target sequence.

Optionally, as an embodiment, the first indication information is to indicate a starting position of the target sequence in the sequence of the shared reference signal.

Optionally, as an embodiment, the first indication information is to indicate resource information of a target resource group.

Optionally, as an embodiment, the first indication information is to indicate a position of a resource in the target resource group in a system resource.

The methods for demodulating the shared reference signal in the embodiments of the disclosure are described above in combination with FIG. 2-6 in detail and terminal devices and network devices in the embodiments of the disclosure will be described below in combination with FIG. 7-14. It is to be understood that the terminal devices and network devices described in FIG. 7-14 may implement each operation of the methods for demodulating the shared reference signal which are described in FIG. 2-6. For simplicity, repeated descriptions are properly omitted.

Figure 7:
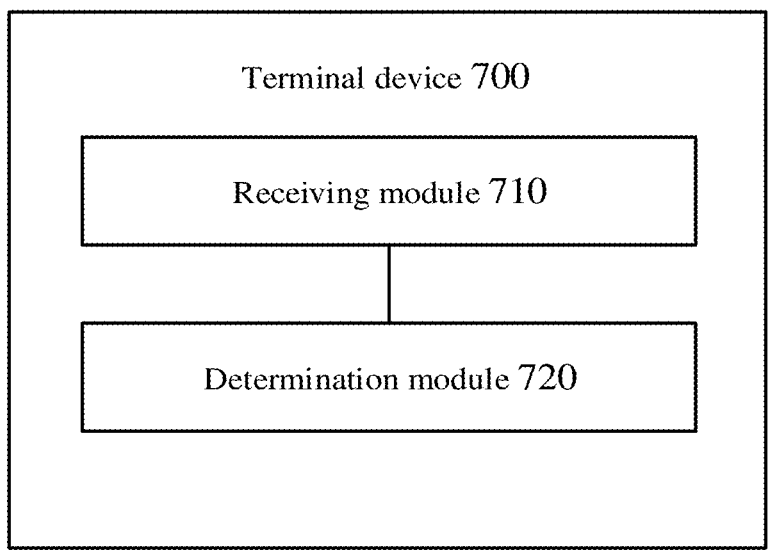
FIG. 7 is a schematic block diagram of a terminal device according to an embodiment of the disclosure.

FIG. 7 is a schematic block diagram of a terminal device according to an embodiment of the disclosure. The terminal device 700 illustrated in FIG. 7 includes a receiving module 710 and a determination module 720.

The receiving module 710 is configured to receive first indication information sent by a network device, here, the first indication information is to indicate resource information of a target resource group allocated for the terminal device.

The determination module 720 is configured to determine a length of a sequence of a shared reference signal according to the resource information of the target resource group, here, the shared reference signal is a reference signal shared by multiple terminal devices and the length of the sequence of the shared reference signal is used to demodulate the shared reference signal.

Optionally, as an embodiment, the first indication information is to indicate a resource in the target resource group or a resource size of a resource in the target resource group, and the determination module 720 is configured to determine the length of the sequence of the shared reference signal according to: a resource size, which is determined according to the resource in the target resource group, of the resource in the target resource group; or the resource size, which is indicated by the first indication information, of the resource in the target resource group.

Optionally, as an embodiment, the determination module 720 is configured to determine the length of the sequence of the shared reference signal according to: the resource size, which is determined according to the resource in the target resource group, of the resource in the target resource group and first preset relationships between resource sizes and lengths of sequences of reference signals, or determine the length of the sequence of the shared reference signal according to: the resource size, which is indicated by the first indication information, of the resource in the target resource group; and first preset relationships between resource sizes and lengths of sequences of reference signals.

Optionally, as an embodiment, the first indication information is to indicate a resource in a target resource section where the target resource group is located or a resource size of a resource in a target resource section where the target resource group is located, and the determination module 720 is configured to determine the length of the sequence of the shared reference signal according to: a resource size, which is determined according to the resource in the target resource section, of the resource in the target resource section; or the resource size, which is indicated by the first indication information, of the resource in the target resource section.

Optionally, as an embodiment, the determination module 720 is configured to determine the length of the sequence of the shared reference signal according to: the resource size, which is determined according to the resource in the target resource section, of the resource in the target resource section; and second preset relationships between resource sizes and lengths of sequences of reference signals, or determine the length of the sequence of the shared reference signal according to: the resource size, which is indicated by the first indication information, of the resource in the target resource section; and second preset relationships between resource sizes and lengths of sequences of reference signals.

Optionally, as an embodiment, the first indication information is to indicate a PRB in the target resource group or the number of PRBs in the target resource group.

Optionally, as an embodiment, the first indication information is to indicate a PRB in the target resource section or the number of PRBs in the target resource section.

Optionally, as an embodiment, each first preset relationship represents that the length of the sequence of the reference signal is N times the resource size, here, N is an integer greater than or equal to 1.

Optionally, as an embodiment, N is an integral multiple of a first numerical value, and the first numerical value is a numerical value which is predetermined by the terminal device and the network device.

Optionally, as an embodiment, each second preset relationship represents that the length of the sequence of the reference signal is M times the resource size, here, M is an integer greater than or equal to 1.

Optionally, as an embodiment, M is an integral multiple of a second numerical value, and the second numerical value is a numerical value which is predetermined by the terminal device and the network device.

Optionally, as an embodiment, the receiving module 710 is further configured to, before the receiving module receives the first indication information sent by the network device, receive second indication information sent by the network device, here, the second indication information is to indicate an initial operation bandwidth allocated for the terminal device and the initial operation bandwidth is less than a system bandwidth; and the determination module 720 is configured to determine the length of the sequence of the shared reference signal according to the initial operation bandwidth and third preset relationships between operation bandwidths and lengths of sequences of reference signals.

Figure 8:
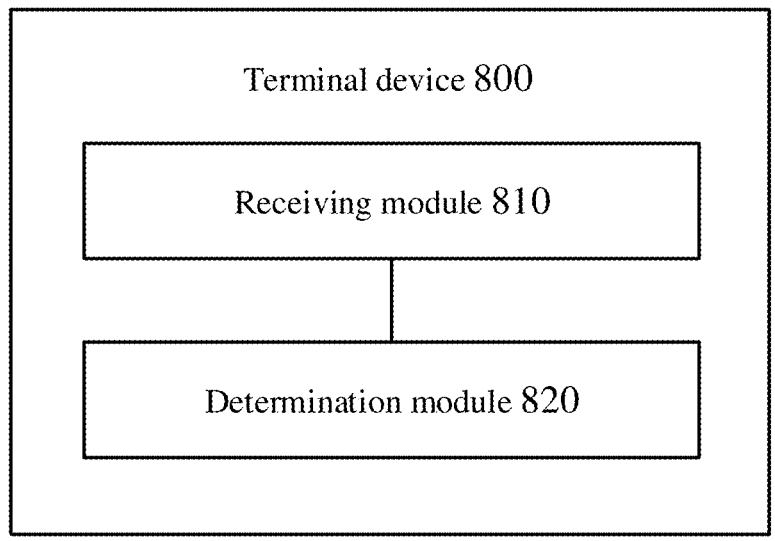
FIG. 8 is a schematic block diagram of a terminal device according to an embodiment of the disclosure.

FIG. 8 is a schematic block diagram of a terminal device according to an embodiment of the disclosure. The terminal device 800 illustrated in FIG. 8 includes a receiving module 810 and a determination module 820.

The receiving module 810 is configured to receive first indication information sent by a network device.

The determination module 820 is configured to determine a target sequence corresponding to the terminal device from a sequence of a shared reference signal according to the first indication information, here, the shared reference signal is a reference signal shared by multiple terminal devices and the target sequence is used to demodulate a target reference signal corresponding to the terminal device from the shared reference signal.

Optionally, as an embodiment, the first indication information is to indicate position information of the target sequence, and the determination module 820 is configured to determine the target sequence from the sequence of the shared reference signal according to the position information of the target sequence and a length of the target sequence.

Optionally, as an embodiment, the first indication information is to indicate a starting position of the target sequence in the sequence of the shared reference signal.

Optionally, as an embodiment, the first indication information is to indicate resource information of a target resource group, and the determination module 820 is configured to determine a position of the target sequence in the sequence of the shared reference signal according to the resource information of the target resource group and determine the target sequence from the sequence of the shared reference signal according to the position of the target sequence in the sequence of the shared reference signal and a length of the target sequence.

Optionally, as an embodiment, the first indication information is to indicate a position of a resource in the target resource group in a system resource.

Figure 9:
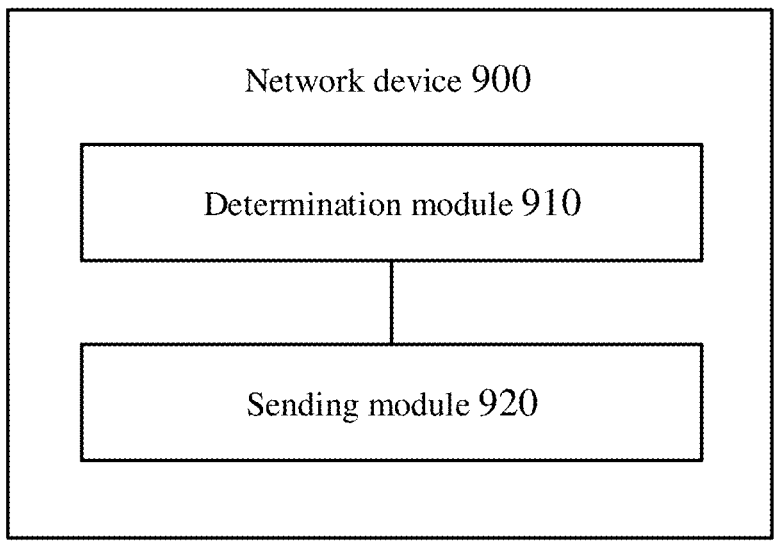
FIG. 9 is a schematic block diagram of a network device according to an embodiment of the disclosure.

FIG. 9 is a schematic block diagram of a network device according to an embodiment of the disclosure. The network device 900 illustrated in FIG. 9 includes a determination module 910 and a sending module 920.

The determination module 910 is configured to determine first indication information, here, the first indication information is to indicate resource information of a target resource group allocated for a terminal device.

The sending module 920 is configured to send the first indication information to the terminal device such that the terminal device determines the resource information of the target resource group according to the first indication information and determines a length of a sequence of a shared reference signal according to the resource information of the target resource group, here, the shared reference signal is a reference signal shared by multiple terminal devices and the length of the sequence of the shared reference signal is used to demodulate the shared reference signal.

Optionally, as an embodiment, the first indication information is to indicate a resource in the target resource group or a resource size of a resource in the target resource group.

Optionally, as an embodiment, the first indication information is to indicate a resource in a target resource section where the target resource group is located or a resource size of a resource in a target resource section where the target resource group is located.

Optionally, as an embodiment, the first indication information is to indicate a PRB in the target resource group or the number of PRBs in the target resource group.

Optionally, as an embodiment, the first indication information is to indicate a PRB in the target resource section or the number of PRBs in the target resource section.

Optionally, as an embodiment, the sending module 920 is further configured to, before the sending module 920 sends the first indication information to the terminal device, send second indication information to the terminal device, here, the second indication information is to indicate an initial operation bandwidth allocated for the terminal device such that the terminal device determines the length of the sequence of the shared reference signal according to the initial operation bandwidth and second preset relationships between operation bandwidths and lengths of sequences of reference signals, here, the initial operation bandwidth is less than a system bandwidth.

Figure 10:
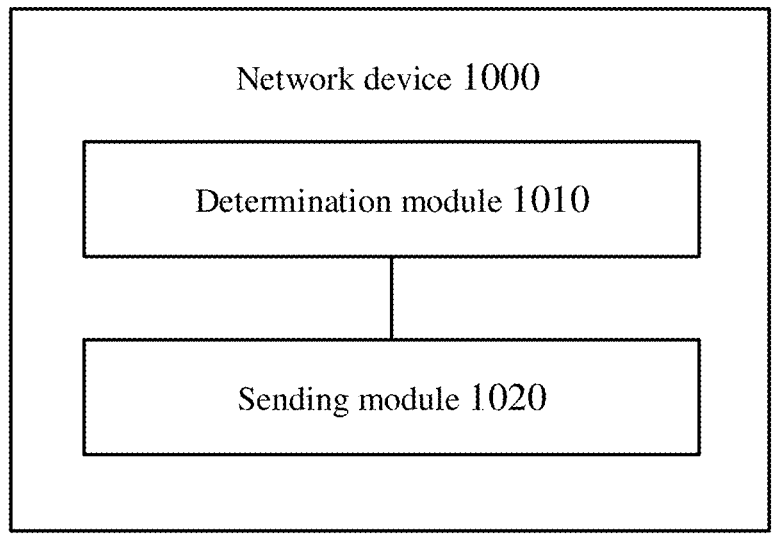
FIG. 10 is a schematic block diagram of a network device according to an embodiment of the disclosure.

FIG. 10 is a schematic block diagram of a network device according to an embodiment of the disclosure. The network device 1000 illustrated in FIG. 10 includes a determination module 1010 and a sending module 1020.

The determination module 1010 is configured to determine first indication information.

The sending module 1020 is configured to send the first indication information to a terminal device such that the terminal device determines a target sequence corresponding to the terminal device from a sequence of a shared reference signal according to the first indication information, here, the shared reference signal is a reference signal shared by multiple terminal devices and the target sequence is used to demodulate a target reference signal corresponding to the terminal device from the shared reference signal.

Optionally, as an embodiment, the first indication information is to indicate position information of the target sequence.

Optionally, as an embodiment, the first indication information is to indicate a starting position of the target sequence in the sequence of the shared reference signal.

Optionally, as an embodiment, the first indication information is to indicate resource information of a target resource group.

Optionally, as an embodiment, the first indication information is to indicate a position of a resource in the target resource group in a system resource.

Figure 11:
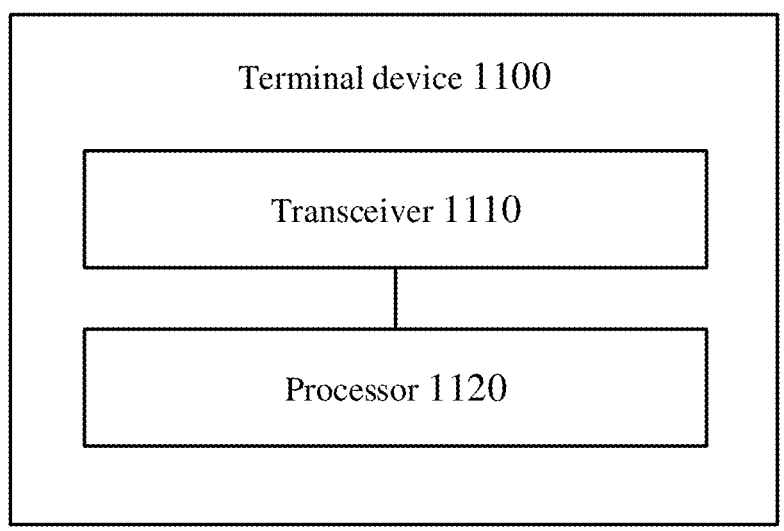
FIG. 11 is a schematic block diagram of a terminal device according to an embodiment of the disclosure.

FIG. 11 is a schematic block diagram of a terminal device according to an embodiment of the disclosure. The terminal device 1100 in FIG. 11 includes a transceiver 1110 and a processor 1120.

Herein, the transceiver 1110 is configured to receive first indication information sent by a network device, here, the first indication information is to indicate resource information of a target resource group allocated for the terminal device.

The processor 1120 is configured to determine a length of a sequence of a shared reference signal according to the resource information of the target resource group, here, the shared reference signal is a reference signal shared by multiple terminal devices and the length of the sequence of the shared reference signal is used to demodulate the shared reference signal.

Optionally, as an embodiment, the first indication information is to indicate a resource in the target resource group or a resource size of a resource in the target resource group, and the processor 1120 is configured to determine the length of the sequence of the shared reference signal according to: a resource size, which is determined according to the resource in the target resource group, of the resource in the target resource group; or the resource size, which is indicated by the first indication information, of the resource in the target resource group.

Optionally, as an embodiment, the processor 1120 is configured to determine the length of the sequence of the shared reference signal according to: the resource size, which is determined according to the resource in the target resource group, of the resource in the target resource group; and first preset relationships between resource sizes and a lengths of sequences of reference signals, or determine the length of the sequence of the shared reference signal according to: the resource size, which is indicated by the first indication information, of the resource in the target resource group; and first preset relationships between resource sizes and lengths of sequences of reference signals.

Optionally, as an embodiment, the first indication information is to indicate a resource in a target resource section where the target resource group is located or a resource size of a resource in a target resource section where the target resource group is located, and the processor 1120 is configured to determine the length of the sequence of the shared reference signal according to: a resource size, which is determined according to the resource in the target resource section, of the resource in the target resource section; or the resource size, which is indicated by the first indication information, of the resource in the target resource section.

Optionally, as an embodiment, the processor 1120 is configured to determine the length of the sequence of the shared reference signal according to: the resource size, which is determined according to the resource in the target resource section, of the resource in the target resource section; and second preset relationships between resource sizes and lengths of sequences of reference signals, or determine the length of the sequence of the shared reference signal according to: the resource size, which is indicated by the first indication information, of the resource in the target resource section; and second preset relationships between resource sizes and lengths of sequences of reference signals.

Optionally, as an embodiment, the first indication information is to indicate a PRB in the target resource group or the number of PRBs in the target resource group.

Optionally, as an embodiment, the first indication information is to indicate a PRB in the target resource section or the number of PRBs in the target resource section.

Optionally, as an embodiment, each first preset relationship represents that the length of the sequence of the reference signal is N times the resource size, here, N is an integer greater than or equal to 1.

Optionally, as an embodiment, N is an integral multiple of a first numerical value, and the first numerical value is a numerical value which is predetermined by the terminal device and the network device.

Optionally, as an embodiment, each second preset relationship represents that the length of the sequence of the reference signal is M times the resource size, here, M is an integer greater than or equal to 1.

Optionally, as an embodiment, M is an integral multiple of a second numerical value, and the second numerical value is a numerical value which is predetermined by the terminal device and the network device.

Optionally, as an embodiment, the transceiver 1110 is further configured to, before a transceiver 1110 receives the first indication information sent by the network device, receive second indication information sent by the network device, here, the second indication information is to indicate an initial operation bandwidth allocated for the terminal device and the initial operation bandwidth is less than a system bandwidth; and the processor 1120 is configured to determine the length of the sequence of the shared reference signal according to the initial operation bandwidth and third preset relationships between operation bandwidths and lengths of sequences of reference signals.

Figure 12:
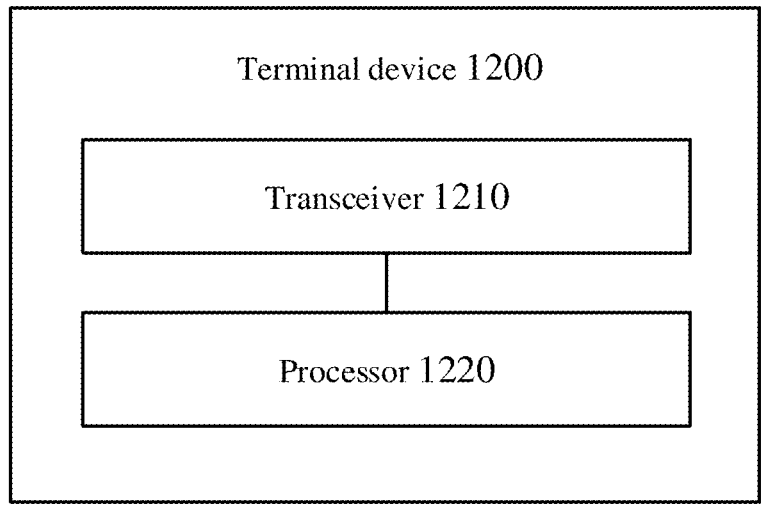
FIG. 12 is a schematic block diagram of a terminal device according to an embodiment of the disclosure.

FIG. 12 is a schematic block diagram of a terminal device according to an embodiment of the disclosure. The terminal device 1200 in FIG. 12 includes a transceiver 1210 and a processor 1220.

Herein, the transceiver 1210 is configured to receive first indication information sent by a network device.

The processor 1220 is configured to determine a target sequence corresponding to the terminal device from a sequence of a shared reference signal according to the first indication information, here, the shared reference signal is a reference signal shared by multiple terminal devices and the target sequence is used to demodulate a target reference signal corresponding to the terminal device the shared reference signal.

Optionally, as an embodiment, the first indication information is to indicate position information of the target sequence, and the processor 1220 is configured to determine the target sequence from the sequence of the shared reference signal according to the position information of the target sequence and a length of the target sequence.

Optionally, as an embodiment, the first indication information is to indicate a starting position of the target sequence in the sequence of the shared reference signal.

Optionally, as an embodiment, the first indication information is to indicate resource information of a target resource group, and the processor 1220 is configured to determine a position of the target sequence in the sequence of the shared reference signal according to the resource information of the target resource group and determine the target sequence from the sequence of the shared reference signal according to the position of the target sequence in the sequence of the shared reference signal and a length of the target sequence.

Optionally, as an embodiment, the first indication information is to indicate a position of a resource in the target resource group in a system resource.

Figure 13:
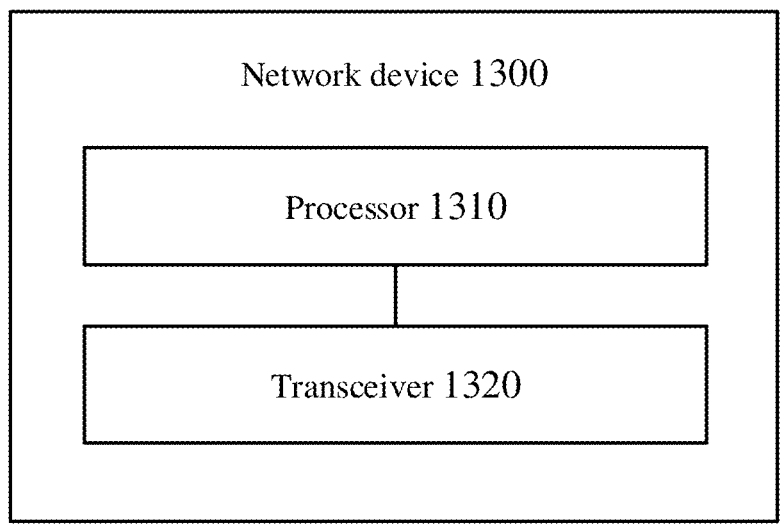
FIG. 13 is a schematic block diagram of a network device according to an embodiment of the disclosure.

FIG. 13 is a schematic block diagram of a network device according to an embodiment of the disclosure. The network device 1300 in FIG. 13 includes a processor 1310 and a transceiver 1320.

Herein, the processor 1310 is configured to determine first indication information, here, the first indication information is to indicate resource information of a target resource group allocated for a terminal device.

The transceiver 1320 is configured to send the first indication information to the terminal device such that the terminal device determines the resource information of the target resource group according to the first indication information and determines a length of a sequence of a shared reference signal according to the resource information of the target resource group, here, the shared reference signal is a reference signal shared by multiple terminal devices and the length of the sequence of the shared reference signal is used to demodulate the shared reference signal.

Optionally, as an embodiment, the first indication information is to indicate a resource in the target resource group or a resource size of a resource in the target resource group.

Optionally, as an embodiment, the first indication information is to indicate a resource in a target resource section where the target resource group is located or a resource size of a resource in a target resource section where the target resource group is located.

Optionally, as an embodiment, the first indication information is to indicate a PRB in the target resource group or the number of PRBs in the target resource group.

Optionally, as an embodiment, the first indication information is to indicate a PRB in the target resource section or the number of PRBs in the target resource section.

Optionally, as an embodiment, the transceiver 1320 is further configured to, before the transceiver 1320 sends the first indication information to the terminal device, send second indication information to the terminal device, here, the second indication information is to indicate an initial operation bandwidth allocated for the terminal device such that the terminal device determines the length of the sequence of the shared reference signal according to the initial operation bandwidth and second preset relationships between operation bandwidths and lengths of sequences of reference signals, here, the initial operation bandwidth is less than a system bandwidth.

Figure 14:
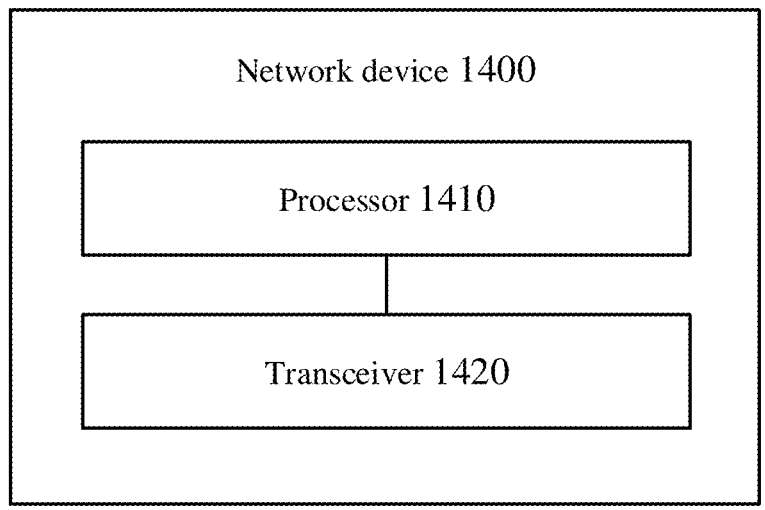
FIG. 14 is a schematic block diagram of a network device according to an embodiment of the disclosure.

FIG. 14 is a schematic block diagram of a network device according to an embodiment of the disclosure. The network device 1400 in FIG. 14 includes a processor 1410 and a transceiver 1420.

Herein, the processor 1410 is configured to determine first indication information.

The transceiver 1420 is configured to send the first indication information to a terminal device such that the terminal device determines a target sequence corresponding to the terminal device from a sequence of a shared reference signal according to the first indication information, here, the shared reference signal is a reference signal shared by multiple terminal devices and the target sequence is used to demodulate a target reference signal corresponding to the terminal device from the shared reference signal.

Optionally, as an embodiment, the first indication information is to indicate position information of the target sequence.

Optionally, as an embodiment, the first indication information is to indicate a starting position of the target sequence in the sequence of the shared reference signal.

Optionally, as an embodiment, the first indication information is to indicate resource information of a target resource group.

Optionally, as an embodiment, the first indication information is to indicate a position of a resource in the target resource group in a system resource.

Figure 15:
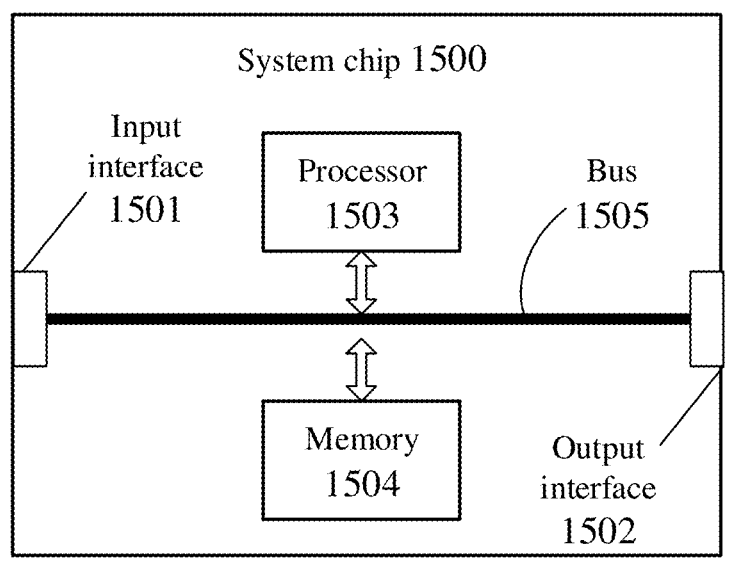
FIG. 15 is a schematic block diagram of a system chip according to an embodiment of the disclosure.

FIG. 15 is a schematic structure diagram of a system chip according to an embodiment of the disclosure. The system chip 1500 of FIG. 15 includes an input interface 1501, output interface 1502, processor 1503 and memory 1504 which are connected through a bus 1505. The processor 1503 is configured to execute a code in the memory 1504.

Optionally, when the code is executed, the processor 1503 implements methods executed by terminal devices in the method embodiments of the disclosure. For simplicity, no more elaborations will be made herein.

Optionally, when the code is executed, the processor 1503 implements methods executed by network devices in the method embodiments. For simplicity, no more elaborations will be made herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the processes corresponding to the method embodiments and will not be elaborated herein for convenient and brief description.

In some embodiments provided by the disclosure, it is to be understood that the disclosed system, device and method may be implemented in another manner. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate components may or may not be physically separated, and components displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for demodulating a shared reference signal, comprising:
   receiving, by a terminal device, first indication information sent by a network device; and
   determining, by the terminal device, a target sequence corresponding to the terminal device from a sequence of the shared reference signal according to the first indication information, wherein the shared reference signal is a reference signal shared by a plurality of terminal devices and the target sequence is used to demodulate a target reference signal corresponding to the terminal device from the shared reference signal,
   wherein the first indication information is to indicate position information of the target sequence, and determining, by the terminal device, the target sequence corresponding to the terminal device from the sequence of the shared reference signal according to the first indication information comprises:
      determining, by the terminal device, the target sequence from the sequence of the shared reference signal according to the position information of the target sequence and a length of the target sequence, or
   wherein the first indication information is to indicate resource information of a target resource group, and determining, by the terminal device, the target sequence corresponding to the terminal device from the sequence of the shared reference signal according to the first indication information comprises:
      determining, by the terminal device, a position of the target sequence in the sequence of the shared reference signal according to the resource information of the target resource group; and
      determining, by the terminal device, the target sequence from the sequence of the shared reference signal according to the position of the target sequence in the sequence of the shared reference signal and a length of the target sequence.

2. The method of claim 1, wherein the first indication information is to indicate a starting position of the target sequence in the sequence of the shared reference signal.

3. The method of claim 1, wherein the first indication information is to indicate a position of a resource in the target resource group in a system resource.

4. A method for demodulating a shared reference signal, comprising:
   determining, by a network device, first indication information; and
   sending, by the network device, the first indication information to a terminal device for determining a target sequence corresponding to the terminal device from a sequence of the shared reference signal according to the first indication information, wherein the shared reference signal is a reference signal shared by a plurality of terminal devices and the target sequence is used to demodulate a target reference signal corresponding to the terminal device from the shared reference signal,
   wherein the first indication information is to indicate position information of the target sequence, or
   wherein the first indication information is to indicate resource information of a target resource group.

5. The method of claim 4, wherein the first indication information is to indicate a starting position of the target sequence in the sequence of the shared reference signal.

6. The method of claim 4, wherein the first indication information is to indicate a position of a resource in the target resource group in a system resource.

7. A terminal device, comprising:
- a transceiver, configured to receive first indication information sent by a network device; and
- a processor, configured to determine a target sequence corresponding to the terminal device from a sequence of a shared reference signal according to the first indication information, wherein the shared reference signal is a reference signal shared by a plurality of terminal devices and the target sequence is used to demodulate a target reference signal corresponding to the terminal device from the shared reference signal,
- wherein the first indication information is to indicate position information of the target sequence, and the processor is configured to determine the target sequence from the sequence of the shared reference signal according to the position information of the target sequence and a length of the target sequence, or
- wherein the first indication information is to indicate resource information of a target resource group, and the processor is configured to:
  - determine a position of the target sequence in the sequence of the shared reference signal according to the resource information of the target resource group and
  - determine the target sequence from the sequence of the shared reference signal according to the position of the target sequence in the sequence of the shared reference signal and a length of the target sequence.

8. The terminal device of claim 7, wherein the first indication information is to indicate a starting position of the target sequence in the sequence of the shared reference signal.

9. The terminal device of claim 7, wherein the first indication information is to indicate a position of a resource in the target resource group in a system resource.

10. A network device, comprising:
- a processor, configured to determine first indication information; and
- a transceiver, configured to send the first indication information to a terminal device for determining a target sequence corresponding to the terminal device from a sequence of a shared reference signal according to the first indication information, wherein the shared reference signal is a reference signal shared by a plurality of terminal devices and the target sequence is used to demodulate a target reference signal corresponding to the terminal device from the shared reference signal,
- wherein the first indication information is to indicate position information of the target sequence, or
- wherein the first indication information is to indicate resource information of a target resource group.

11. The network device of claim 10, wherein the first indication information is to indicate a starting position of the target sequence in the sequence of the shared reference signal.

12. The network device of claim 10, wherein the first indication information is to indicate a position of a resource in the target resource group in a system resource.

* * * * *